US009313753B2

(12) United States Patent
Jeon et al.

(10) Patent No.: US 9,313,753 B2
(45) Date of Patent: Apr. 12, 2016

(54) METHOD AND DEVICE FOR CONTROLLING HAND-OVER MESSAGE TRANSMISSION POWER IN A MOBILE COMMUNICATIONS SYSTEM

(75) Inventors: Young-Hyun Jeon, Guri-si (KR); Jong-Hyung Kwun, Seongnam-si (KR); Jae-Hyun Kim, Seoul (KR); Hyun-Jin Lee, Pohang-si (KR); Ji-Soo Kim, Chuncheon-si (KR)

(73) Assignees: Samsung Electronics Co., Ltd., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 320 days.

(21) Appl. No.: 13/001,536

(22) PCT Filed: Jun. 30, 2009

(86) PCT No.: PCT/KR2009/003533
§ 371 (c)(1),
(2), (4) Date: Dec. 27, 2010

(87) PCT Pub. No.: WO2010/002169
PCT Pub. Date: Jan. 7, 2010

(65) Prior Publication Data
US 2011/0103282 A1   May 5, 2011

(30) Foreign Application Priority Data

Jun. 30, 2008  (KR) .................. 10-2008-0062517

(51) Int. Cl.
*G08C 17/00*  (2006.01)
*H04W 52/40*  (2009.01)
*H04W 36/00*  (2009.01)
*H04W 36/08*  (2009.01)

(Continued)

(52) U.S. Cl.
CPC .......... *H04W 52/40* (2013.01); *H04W 36/0005* (2013.01); *H04W 36/08* (2013.01); *H04W 52/146* (2013.01); *H04W 52/325* (2013.01); *Y02B 60/50* (2013.01)

(58) Field of Classification Search
CPC . H04W 52/40; H04W 36/0005; H04W 36/08; H04W 52/325; H04W 52/146; Y02B 60/50
USPC ........................................ 370/311
See application file for complete search history.

(56) References Cited

U.S. PATENT DOCUMENTS 7,961,641 B1 *  6/2011  Choi et al. ............... 370/252
2004/0166888 A1  8/2004  Ahn et al.

(Continued)

FOREIGN PATENT DOCUMENTS

KR   10-2005-0052124 A   6/2005
KR   10-2007-0000307 A   1/2007

*Primary Examiner* — Ayaz Sheikh
*Assistant Examiner* — Hai-Chang Hsiung
(74) *Attorney, Agent, or Firm* — Jefferson IP Law, LLP

(57) ABSTRACT

The present invention relates to a method and a device for controlling the hand-over message transmission power of a mobile station in a mobile communication system. The present invention comprises the processes of: acquiring uplink data relating to a hand-over target base station; using the uplink data to determine the maximum transmission power of a hand-over ranging message; and transmitting a hand-over ranging message having a power level below the determined maximum transmission power to the hand-over target base station.

13 Claims, 10 Drawing Sheets

(51) Int. Cl.
  *H04W 52/14* (2009.01)
  *H04W 52/32* (2009.01)

(56) References Cited

U.S. PATENT DOCUMENTS

| 2005/0003824 A1* | 1/2005 | Siris | 455/452.1 |
| 2005/0084031 A1* | 4/2005 | Rosen et al. | 375/295 |
| 2005/0117539 A1* | 6/2005 | Song et al. | 370/328 |
| 2006/0189323 A1* | 8/2006 | Usuda et al. | 455/453 |
| 2006/0194553 A1* | 8/2006 | Ozaki et al. | 455/226.1 |
| 2007/0015511 A1* | 1/2007 | Kwun et al. | 455/436 |
| 2008/0285499 A1* | 11/2008 | Zhang et al. | 370/315 |

* cited by examiner

METHOD AND DEVICE FOR CONTROLLING HAND-OVER MESSAGE TRANSMISSION POWER IN A MOBILE COMMUNICATIONS SYSTEM

PRIORITY

This application claims priority under 35 U.S.C. §119(a) to a Korean Patent Application filed in the Korean Intellectual Property Office on Jun. 30, 2008 and assigned Serial No. 10-2008-0062517, the contents of which are herein incorporated by reference.

BACKGROUND OF THE INVENTION

1. Field of the Invention

The present invention relates to a method and device for controlling handover message transmission power in a mobile communication system. More particularly, the present invention relates to a method and device for controlling transmission power of a handover ranging message considering uplink of a mobile station.

2. Description of the Related Art

In general, a mobile communication system supports handover for establishing a new communication path between a Mobile Station (hereinafter, referred to as "MS") and a Base Station (hereinafter, referred to as "BS") according to the change of the communication environment in order to support a seamless service.

As illustrated in FIG. 1, for the handover, the IEEE 802.16e mobile WiMAX system performs a scanning procedure (not shown) in which an MS measures signals of a serving BS and a neighbor BS, a pre-handover procedure 110 of determining a handover target BS of the MS, and a handover execution procedure 120 in which the MS resets connection with the target BS. That is, every predetermined period or whenever a received signal quality of the serving BS decreases below a predetermined level, the MS transmits a scanning request to the serving BS and acquires signal quality information of neighbor BSs. If the handover target BS is determined by the serving BS, the MS performs handover ranging for doing handover to the target BS after releasing connection with the serving BS. Here, a ranging process between the target BS and the MS gets different depending on whether an association procedure of adjusting an initial MS power value, a time difference value for synchronization, etc. with the target BS of the MS has been previously performed.

In case that the association procedure has not been previously performed, the MS selects a random ranging code from a CDMA handover ranging domain of the target BS and transmits this within a ranging interval of the target BS. At this time, if the target BS successfully receives the ranging code, the target BS transmits a ranging response (RNG_RSP) message representing a success to the MS, thereby providing uplink allocation for a ranging request (RNG_REQ) message. Or, in case that the target BS has received the ranging code but cannot use the received ranging code, the target BS transmits the MS a ranging response (RNG_RSP) message set to 'continue' and allows the MS to transmit a different random ranging code within a ranging interval of a next period. In case that the serving BS fails to receive the ranging code, the MS retransmits a ranging code after a predetermined time (T3) lapses.

On the contrary, in case that the association procedure has been previously performed, the serving BS transmits a Fast_ranging_IE( ) to the MS and informs of ranging code and slot information to be used in a ranging request (RNG-REQ), and the MS transmits a ranging request (RNG-REQ) message at a defined slot using the ranging code.

When performing handover ranging as above, the conventional art determines the maximum transmission power of the handover ranging message using downlink information as in Equation 1 below and then, transmits the ranging code or ranging request message at a power level below the determined maximum transmission power. Here, the maximum transmission power is a value determined on the presupposition that channel situations of uplink and downlink are symmetric.

$$P_{TX\_IR\_MAX} = \text{EIR} \times P_{IR,max} - BS\_EIRP - RSS \quad (1)$$

Here, the '$T_{TX\_IR\_MAX}$' represents the maximum transmission power for a ranging message, the '$\text{EIR} \times P_{IR,max}$' represents the maximum equivalent isotropic received power at BS, the 'BS_EIRP' represents equivalent isotropic radiated power of BS, and the 'RSS' represents an RSSI (Received Signal Strength Indicator) measured by an MS.

However, in an actual OFDMA (Orthogonal Frequency Division Multiple Access) system, a difference of interference between uplink and downlink may lead to the occurrence of asymmetric channel situations of the uplink and downlink. Accordingly, in case that it is to transmit a handover ranging message at the maximum transmission power considering only downlink as in Equation 1 above, because of the bad channel situation of the uplink, a BS may fail to successfully receive the handover ranging message. In case that the MS fails to successfully receive the ranging code as above, after the MS increases transmission power by one level and waits a response during a predetermined time (T3), the MS selects and retransmits a different ranging code. This causes an increase of a handover interruption time and, resultantly, there is a problem that a quality of a service is deteriorated. If initial transmission power is greatly set to solve the above problem, the power consumption of the MS can increase and act as great interference in a BS, thus leading to the deterioration of performance of the entire system.

Accordingly, there is a need to provide a method for controlling the maximum transmission power for handover ranging in an asymmetric situation of the uplink and downlink channels.

SUMMARY OF THE INVENTION

An aspect of the present invention is to substantially solve at least the above problems and/or disadvantages and to provide at least the advantages below. Accordingly, one aspect of the present invention is to provide a method and device for controlling handover message transmission power in a mobile communication system.

Another aspect of the present invention is to provide a method and device for controlling handover message transmission power considering uplink of an MS in a mobile communication system.

A further aspect of the present invention is to provide a method and device for controlling handover message transmission power, for reducing a handover interruption time in a mobile communication system.

The above aspects are achieved by providing a method and device for controlling handover message transmission power in a mobile communication system.

According to one aspect of the present invention, a method for controlling handover message transmission power of a mobile station in a mobile communication system is provided. The method includes acquiring uplink information on a handover target base station, determining the maximum transmission power of a handover ranging message using the uplink information, and transmitting the handover target base station a handover ranging message having a power level below the determined maximum transmission power.

According to another aspect of the present invention, a method of a serving base station for controlling handover message transmission power of a mobile station in a mobile communication system is provided. The method includes the steps of, if a scanning interval allocation request (MOB_SCN_REQ) message is received from a mobile station, providing information on an uplink and downlink measurement interval to the mobile station and neighbor base stations, receiving uplink information from the neighbor base stations, when handover initiation is requested from the mobile station, determining a handover target base station among the neighbor base stations, and transmitting uplink information received from the handover target base station to the mobile station.

According to a further aspect of the present invention, a method of a neighbor base station for controlling handover message transmission power of a mobile station in a mobile communication system is provided. The method includes the steps of measuring an uplink signal of a specific mobile station using information on an uplink measurement interval provided from a serving base station of the specific mobile station, providing the uplink signal measurement result to a mobile station, and providing received power information on a handover ranging message to the mobile station.

According to a yet another aspect of the present invention, a device for controlling handover message transmission power of a mobile station in a mobile communication system is provided. The device includes a transceiver for receiving uplink information on a handover target base station, and transmitting the handover target base station a handover ranging message, a transmission power determiner for determining the maximum transmission power of a handover ranging message using the uplink information, and a transmission power controller for controlling the handover ranging message to be transmitted at a power level below the determined maximum transmission power.

According to a still another aspect of the present invention, a device of a serving base station for controlling handover message transmission power of a mobile station in a mobile communication system is provided. The device includes a controller for, if a scanning interval allocation request (MOB_SCN_REQ) message is received from a mobile station, providing information on an uplink and downlink measurement interval to the mobile station and neighbor base stations, and transmitting uplink information received from the neighbor base stations to the mobile station.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components, and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A technology for determining the maximum transmission power of a handover message considering uplink of an MS in a mobile communication system according to the present invention is described below. That is, the following description is made for a method and device in which neighbor BSs measure an uplink signal of an MS in a scanning process, and the MS determines the maximum transmission power of a handover ranging message using measured uplink information and then transmits a handover ranging message having a power level below the determined maximum transmission power to a handover target BS.

Then, a description is first made for a method for acquiring uplink information for determining the maximum transmission power of a handover ranging message.

Figure 1:
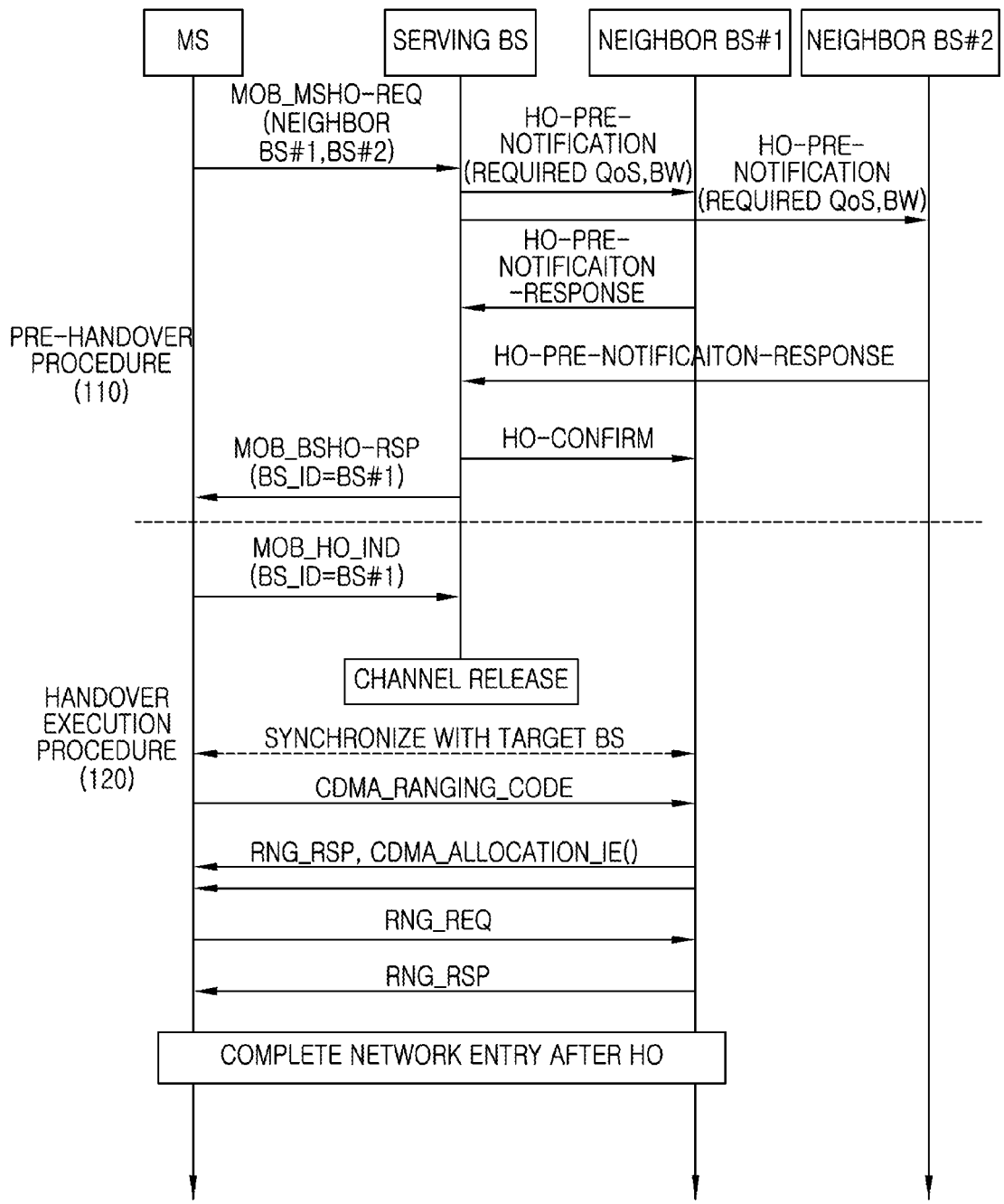
FIG. 1 is a diagram illustrating a handover procedure of the IEEE 802.16e mobile WiMAX system.
Figure 2:
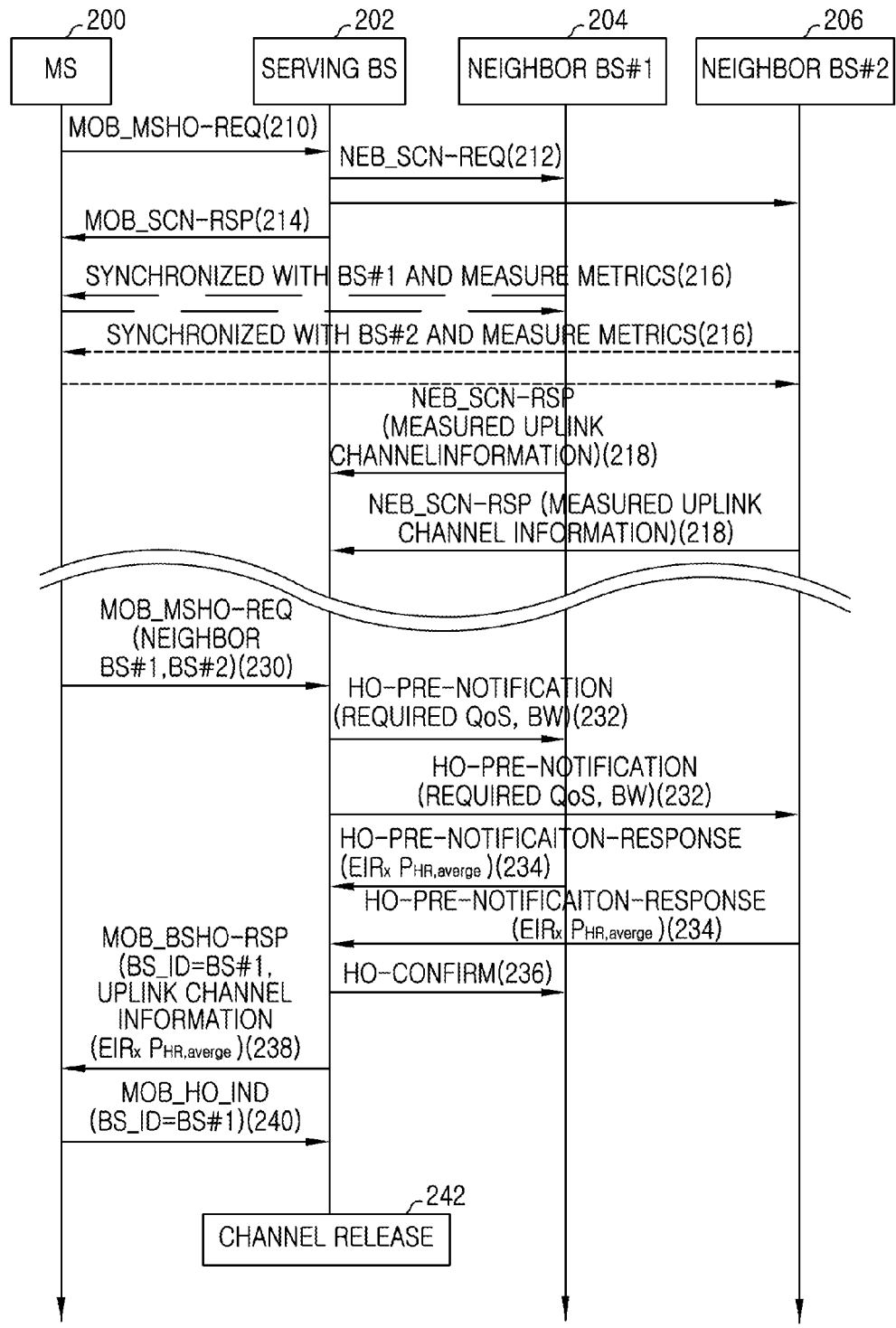
FIG. 2 is a diagram illustrating a procedure for acquiring uplink information upon handover execution in a mobile communication system according to the present invention.

FIG. 2 illustrates a procedure for acquiring uplink information upon handover execution in a mobile communication system according to the present invention.

Referring to FIG. 2, first, every preset period or if a downlink signal is attenuated, in step 210, an MS 200 transmits a scanning interval allocation request (MOB_SCN_REQ) message to a serving BS 202. After that, in step 212, the serving BS 202 transmits neighbor BSs 204 and 206 a neighbor BS scanning request (NBR_SCN_REQ) message including information of the MS 200 and information on an uplink measurement interval. In step 214, the serving BS 202 transmits the MS 200 a scanning interval allocation response (MOB_SCN_RSP) message including information on an interval capable of measuring downlink of the neighbor BSs.

After that, in step 216, the MS 200 and the neighbor BSs 204 and 206 perform synchronization for a scanning process and measures uplink and downlink signals. That is, the MS 200 measures a downlink signal of each of the neighbor BSs 204 and 206 in the downlink measurement interval and measures signal power, interference power, noise power and the like, and the neighbor BSs 204 and 206 each measure an uplink signal of the MS 200 in the uplink measurement interval and measures signal power, interference power, noise power and the like. Here, the MS 200 transmits a scanning message to the neighbor BSs 204 and 206 for the sake of the scanning process, and stores a transmission power value of the scanning message.

After that, in step 218, the neighbor BSs 204 and 206 each transmit a neighbor BS scanning response (NBR_SCN_RSP) message including the uplink signal measurement result to the serving BS 202.

If a downlink signal of a serving BS is attenuated, in step 230, the MS 200 transmits a handover request (MOB_MSHO_REQ) message to the serving BS 202 and initiates handover. Here, although the MS 200 has requested handover, the serving BS 202 may initiate the handover by sensing that an uplink signal is attenuated below a predetermined level and transmitting a handover request (MOB_BSHO_REQ) message to the MS.

In step 232, the serving BS 202 receiving a handover initiation request from the MS 200 or attempting handover transmits a handover previous notification (HO-pre-notification) message to the neighbor BSs 204 and 206. Here, the handover previous notification message includes information of required QoS, bandwidth, and the like.

Then, in step 234, the neighbor BSs 204 and 206 transmit a handover previous notification response (HO-pre-notification response) message to the serving BS 202. At this time, the handover previous notification response message includes a service quality level capable of being provided in each of the neighbor BSs 204 and 206 and average equivalent isotropic received power for handover ranging message ($EIR_X$ $P_{HR,average}$). At this time, the average equivalent isotropic received power for the handover ranging message represents average equivalent isotropic received power for handover ranging message that the neighbor BSs 204 and 206 each receive from a plurality of MSs. That is, the neighbor BSs 204 and 206 each measure equivalent isotropic received power for handover ranging message received whenever the handover ranging message are received from the plurality of MSs, determine an average value with reference to values of equivalent isotropic received power for previously received handover ranging message and store, and then provide to the serving BS 202 through the handover previous notification response message.

After that, the serving BS 202 selects one neighbor BS capable of providing better service to the MS, for example, a 1st neighbor BS 204 among the neighbor BSs 204 and 206 and determines as a handover target BS and then, proceeds to step 236 and transmits a handover confirm (HO-confirm) message to the 1st neighbor BS 204 determined as the handover target BS.

And, in step 238, the serving BS 202 transmits the MS 200 a handover response (MOB_BSHO_RSP) message of indicating a handover to the 1st neighbor BS 204 that is the handover target BS. Here, the handover response message includes ID information of the 1st neighbor BS 204, uplink measurement information (e.g., power of an uplink received signal, interference power, and noise power) acquired from the neighbor BS 204 in the scanning process, and average equivalent isotropic received power for handover ranging message acquired through the handover previous notification response message.

After that, in step 240, the MS 200 transmits the serving BS 202 a handover indication (MOB_HO_IND) message as final indication for handover execution, so a channel between the MS and the serving BS is released in step 242.

In FIG. 2 aforementioned, the neighbor BS obtains average equivalent isotropic received power for handover ranging message received from a plurality of MSs and provides to the serving BS, but may obtain the maximum equivalent isotropic received power or the minimum equivalent isotropic received power among equivalent isotropic received power for the handover ranging message received from the plurality of MSs in place of the average equivalent isotropic received power and provide to the serving BS. Also, uplink information measured in the neighbor BS may be forwarded to an MS through a backbone network, and the neighbor BS may forward directly to the MS through a wireless link.

Then, a description is made for a method for determining the maximum transmission power of the handover ranging message through the uplink information acquired as in FIG. 2 above, and performing handover ranging on the basis of this.

Figure 3:
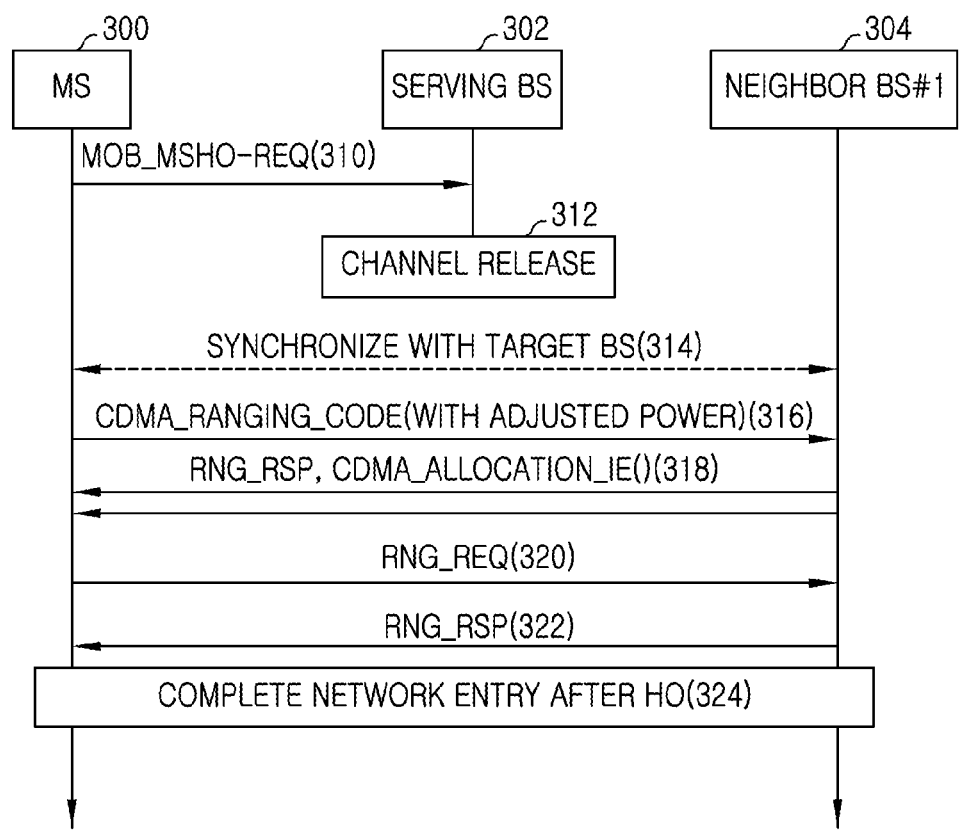
FIG. 3 is a diagram illustrating a procedure of performing handover using the maximum transmission power considering uplink in a mobile communication system according to the present invention.

FIG. 3 illustrates a procedure of performing handover using the maximum transmission power considering uplink in a mobile communication system according to the present invention.

Referring to FIG. 3, in step 310, an MS 300 transmits a handover indication (MOB_HO_IND) message to a serving BS 302. If a channel with the serving BS 302 is released through step 312, the MS 300 proceeds to step 314 and performs synchronization with a handover target BS 304.

After that, after determining the maximum transmission power of a handover ranging message as in Equation 2 or Equation 3 below using previously acquired uplink information, the MS 300 proceeds to step 316 and transmits a CDMA_Ranging_Code to the target BS 304 at a power level below the determined maximum transmission power. Then, in step 318, the target BS 304 transmits a ranging response message or a CDMA_allocation_IE( ) message to the MS 300.

Equation 2 below represents a method of determining the maximum transmission power using uplink received signal strength, and Equation 3 below represents a method of determining the maximum transmission power considering uplink received signal strength and uplink interference.

$$P_{TX\_HR\_MAX} = \text{EIR} \times P_{HR,max,min,average} - MS\_EIRP - RSS_{BS} \quad (2)$$

$$P_{TX\_HR\_MAX} = \text{EIR} \times P_{HR,max,min,average} - MS\_EIRP - 10 \log(RSS_{BS}/10 - P_{interference} - P_{noise}) \quad (3)$$

In Equation 2 and Equation 3, the $T_{TX\_HR\_MAX}$ represents the maximum transmission power of a handover ranging message, the '$EIR \times P_{HR,max,min,average}$' represents an average value, maximum value, or minimum value of equivalent isotropic received power for handover ranging message, and is a value determined and received in a neighbor BS determined as a handover target BS. Also, the 'MS_EIRP' represents equivalent isotrop radiated power of MS, and uses a transmission power value of a scanning message that the MS transmits in a scanning process. And, the '$RSS_{BS}$' represents an RSSI (Received Signal Strength Indicator) measured in the target BS, and the '$P_{interference}$' and the '$P_{noise}$' represent interference power of a linear unit for uplink measured in the target BS and noise power.

After that, in step 320, the MS 300 transmits the target BS 304 a ranging request (RNG_REQ) message for initial power leveling and range measurement. After transmitting the MS 300 a ranging response (RNG_RSP) message including information on power adjustment in step 322, the target BS 304 completes a network entry process between the MS 300 and the target BS 304 through step 324.

Figure 4:
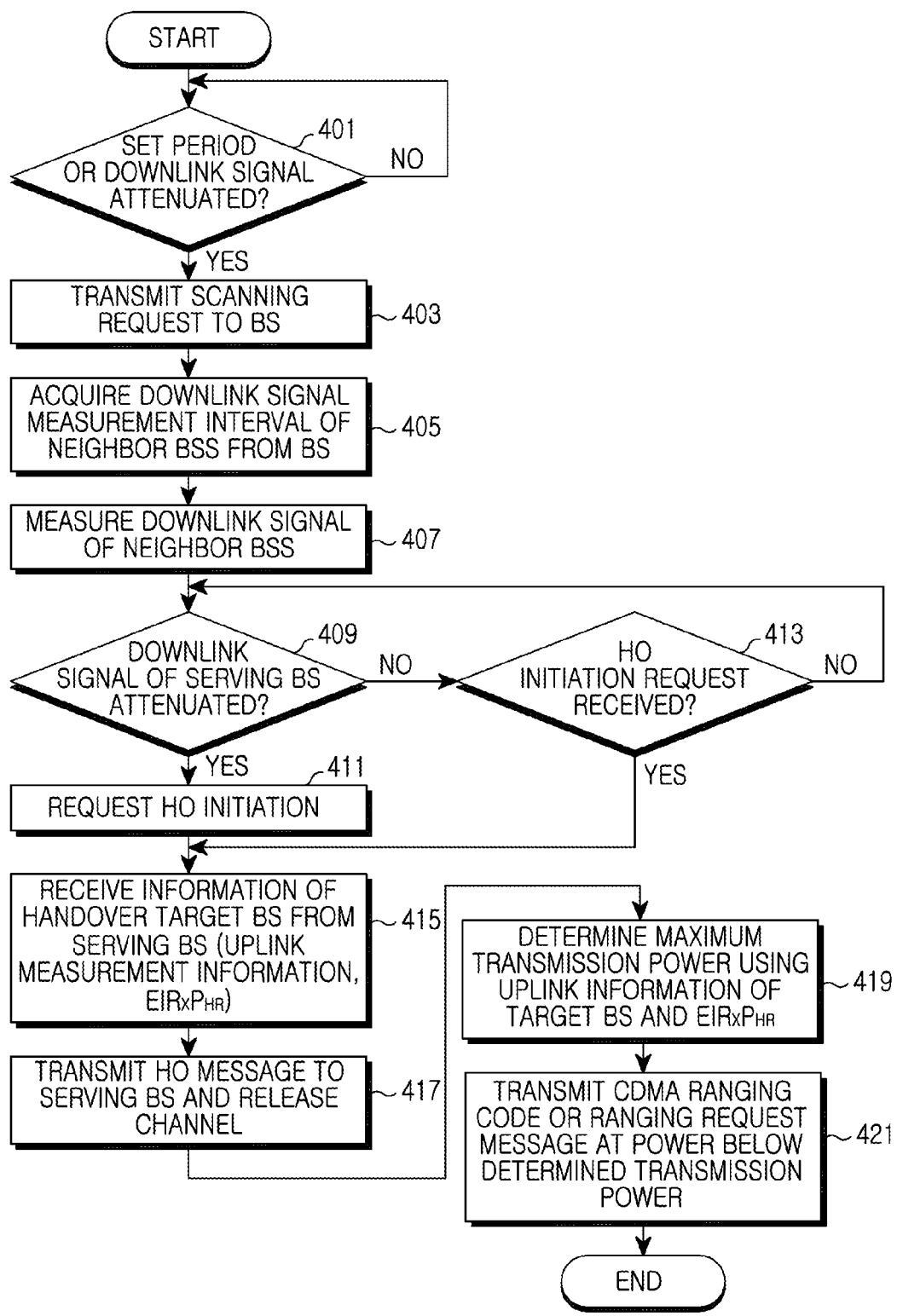
FIG. 4 is a diagram illustrating an operation procedure of an MS determining the maximum transmission power of a handover message considering uplink in a mobile communication system according to an exemplary embodiment of the present invention.

FIG. 4 illustrates an operation procedure of an MS determining the maximum transmission power of a handover message considering uplink in a mobile communication system according to an exemplary embodiment of the present invention.

Referring to FIG. 4, every preset period or if it is sensed that downlink signal power is attenuated below a predetermined level in step 401, the MS proceeds to step 403 and transmits a scanning interval allocation request (MOB_SCN_REQ) message to a serving BS for scanning.

After that, in step 405, the MS receives a scanning interval allocation response (MOB_SCN_RSP) message from the serving BS and acquires information on downlink measurement intervals of neighbor BSs and then, in step 407, performs synchronization with the neighbor BSs and measures a downlink signal. At this time, the MS transmits a scanning message to the neighbor BSs and stores a transmission power value of the scanning message.

Next, in step 409, the MS senses if downlink signal power of the serving BS is attenuated below a predetermined level and, when it is attenuated, proceeds to step 411 and transmits a handover request (MOB_MSHO_REQ) message to the serving BS 202 and requests handover initiation and then, proceeds to step 415 below. On the contrary, when the downlink signal power is not attenuated below a predetermined level, the MS proceeds to step 413 and checks if a handover request (MOB_BSHO_REQ) message for handover initiation is received from the serving BS and, when the handover request message is not received, returns to step 409 and again performs subsequent steps and, when the handover request message is received, proceeds to step 415 below.

In step 415, the MS receives a handover response (MOB_BSHO_RSP) message including information of a handover target BS from the serving BS. Here, the handover response message includes ID information of the target BS, information that the target BS measures on uplink of the MS, and average equivalent isotropic received power for handover ranging message measured in the target BS. After that, in step 417, the MS transmits a handover indication (MOB_HO_IND) message to the serving BS and releases a channel with the serving BS.

After that, in step 419, the MS determines the maximum transmission power as in Equation 2 or Equation 3 using the received uplink information of the target BS and the average equivalent isotropic received power for the handover ranging message.

Next, in step 421, the MS transmits the CDMA ranging code or ranging request message at a level below the determined maximum transmission power and performs a network entry process.

After that, the MS terminates the algorithm according to the present invention.

Figure 5:
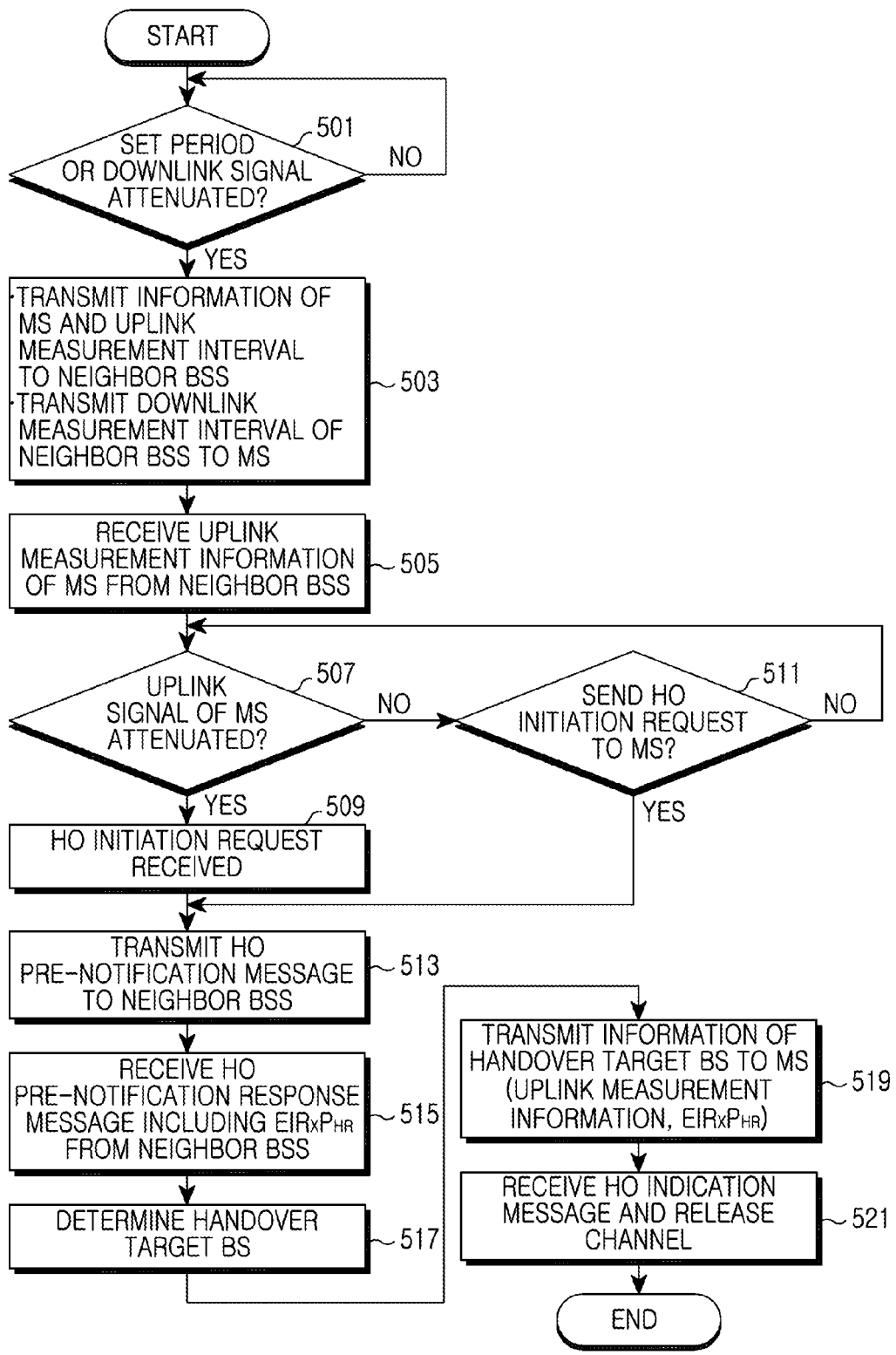
FIG. 5 is a diagram illustrating an operation procedure of a serving BS in a mobile communication system according to an exemplary embodiment of the present invention.

FIG. 5 illustrates an operation procedure of a serving BS in a mobile communication system according to an exemplary embodiment of the present invention.

Referring to FIG. 5, if a scanning interval allocation request (MOB_SCN_REQ) message is received from an MS in step 501, in step 503, the serving BS transmits neighbor BSs a neighbor BS scanning request (NBR_SCN_REQ) message including information of the MS and information on an uplink measurement interval, and transmits the MS a scanning interval allocation response (MOB_SCN_RSP) message including information on an interval capable of measuring downlink of neighbor BSs.

After that, in step 505, the serving BS receives a neighbor BS scanning response (NBR_SCN_REQ) message including the uplink signal measurement result of the MS from the neighbor BSs. At this time, the uplink signal measurement result includes an uplink received signal power level, an interference power level, a noise power level, and the like.

After that, in step 507, the serving BS monitors if uplink signal power of the MS is attenuated below a predetermined level and, when it is attenuated, the serving BS proceeds to step 509 and transmits a handover request (MOB_BSHO_REQ) message to the MS and requests handover initiation and then, the serving BS proceeds to step 513 below. On the contrary, when the uplink signal power is not attenuated below a predetermined level, the serving BS proceeds to step 511 and checks if a handover request (MOB_MSHO_REQ) message for handover initiation is received from the MS and, when the handover request (MOB_MSHO_REQ) message is not received, the serving BS returns to step 507 and again performs subsequent steps and, when the handover request (MOB_MSHO_REQ) message is received, the serving BS proceeds to step 513 below.

After that, in step 513, the serving BS transmits a handover previous notification (HO-pre-notification) message to the neighbor BSs. Here, the handover previous notification message includes information of required QoS, bandwidth, etc.

After that, in step 515, the serving BS receives, from the neighbor BSs, a handover previous notification response (HO-pre-notification response) message including a service quality level capable of being provided by each and average equivalent isotropic received power for handover ranging message.

After that, in step 517, the serving BS selects a neighbor BS capable of providing a better service to the MS among the neighbor BSs and determines as a handover target BS, and transmits a handover confirm (HO-confirm) message to the handover target BS.

After that, in step 519, the serving BS transmits the MS a handover response (MOB_BSHO_RSP) message indicating a handover to the handover target BS. Here, the handover response message includes ID information of the target BS, uplink information that the target BS measures in the scanning process, and average equivalent isotropic received power for handover ranging message of the target BS.

After that, in step 521, the serving BS receives a handover indication (MOB_HO_IND) message from the MS and releases a channel with the MS and, terminates the algorithm according to the present invention.

Figure 6:
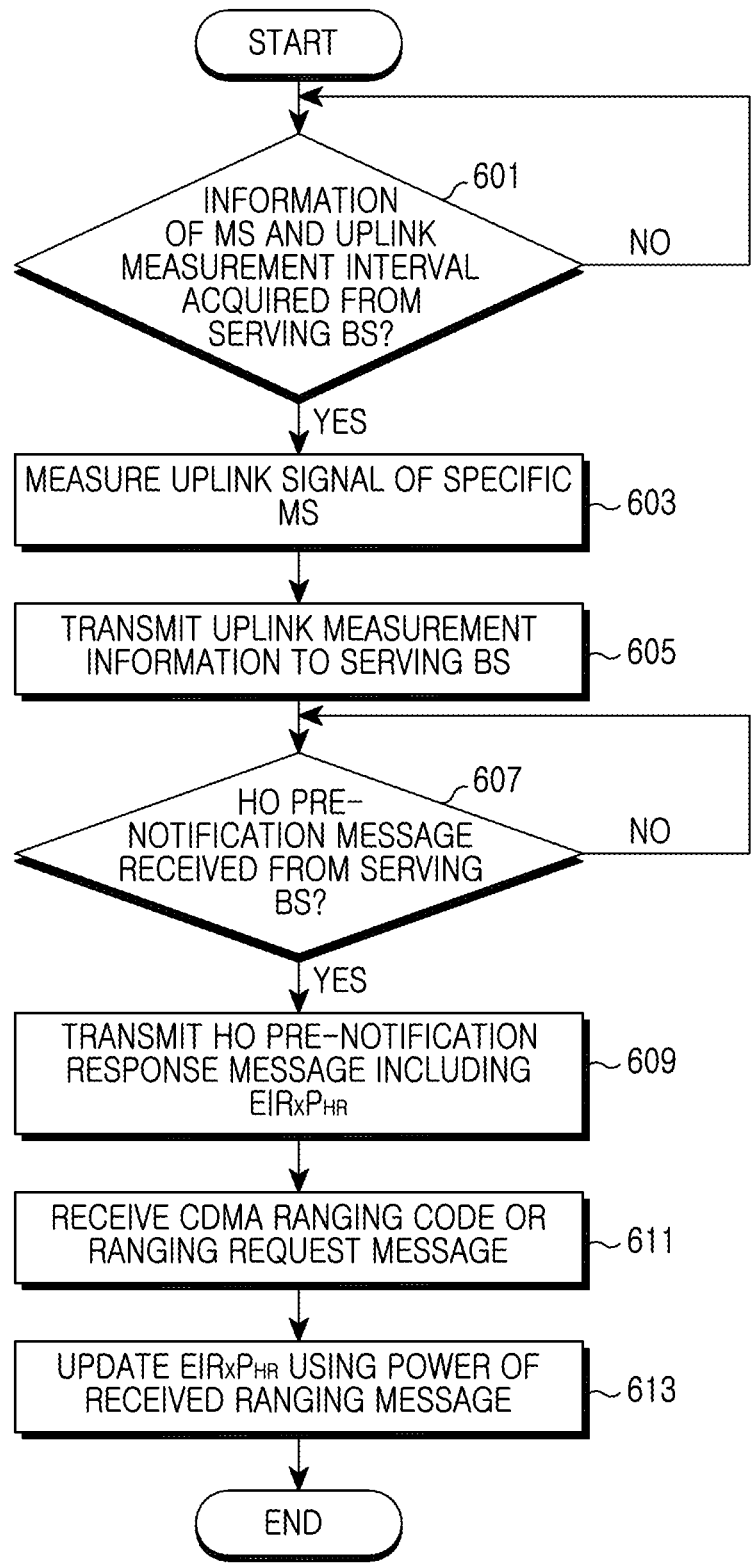
FIG. 6 is a diagram illustrating an operation procedure of a neighbor BS in a mobile communication system according to an exemplary embodiment of the present invention.

FIG. 6 illustrates an operation procedure of a neighbor BS in a mobile communication system according to an exemplary embodiment of the present invention.

Referring to FIG. 6, in step 601, the neighbor BS checks if a neighbor BS scanning request (NBR_SCN_REQ) message including information of a specific MS and information on an uplink measurement interval from a serving BS of the specific MS. When the neighbor BS scanning request (NBR_SCN_REQ) message is received, in step 603, the neighbor BS measures a signal power level, an interference power level, and a noise power level, and the like from an uplink signal of the specific MS in the uplink measurement interval and then, the neighbor BS proceeds to step 605 and transmits the serving BS a neighbor BS scanning response (NBR_SCN_REQ) message including the uplink signal measurement result.

After that, in step 607, the neighbor BS checks if a handover previous notification (HO-pre-notification) message is received from the serving BS. Here, the handover previous notification message includes information on required QoS, bandwidth, etc.

When the handover previous notification (HO-pre-notification) message is received, in step 609, the neighbor BS transmits the serving BS a handover previous notification response (HO-pre-notification response) message including a service quality level that itself can provide and average equivalent isotropic received power for handover ranging message.

After that, the neighbor BS receives a handover confirm (HO-confirm) message of informing that it is determined as a handover target BS from the serving BS and performs synchronization with the MS and then, in step 611, the neighbor BS receives a CDMA_Ranging_Code or a ranging request (RNG-REQ) message from the MS and transmits a response message to this, thereby performing a network entry process. Here, the CDMA_Ranging_Code or ranging request (RNG_REQ) message received from the MS has a level below the maximum transmission power determined considering uplink in the MS.

After that, in step 613, the neighbor BS updates average equivalent isotropic received power for handover ranging message using power of the received CDMA_Ranging_Code or ranging request (RNG_REQ) message, and terminates the algorithm according to the present invention.

Figure 7:
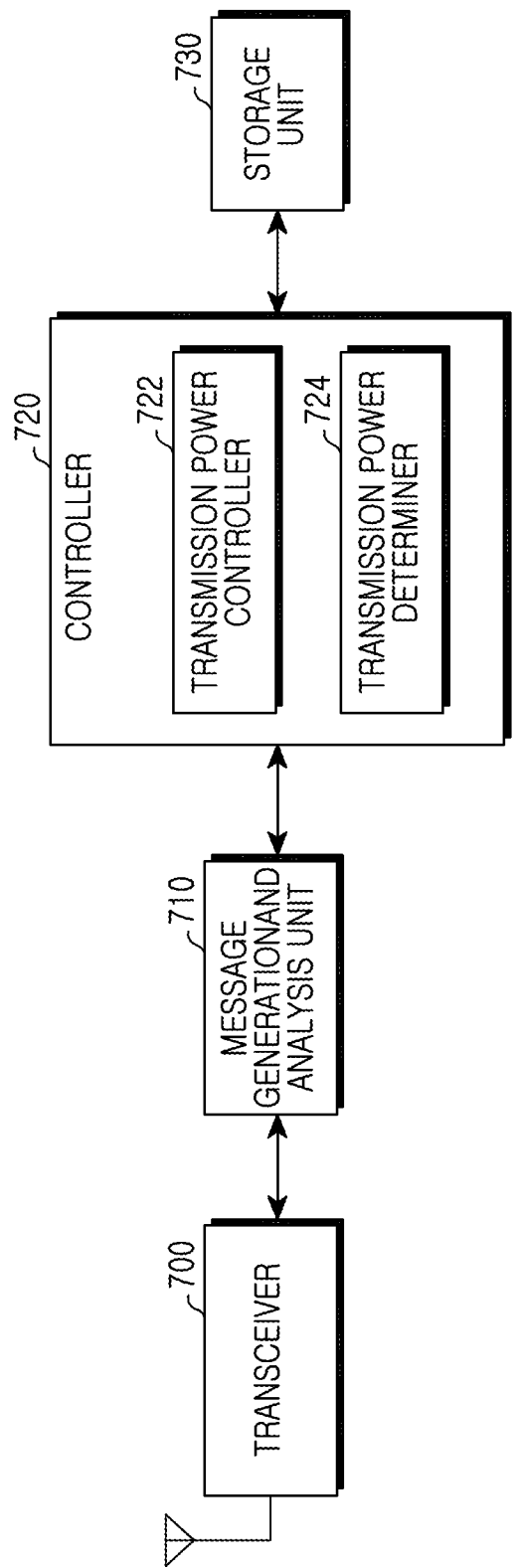
FIG. 7 is a block diagram illustrating a construction of an MS in a mobile communication system according to an exemplary embodiment of the present invention.

FIG. 7 illustrates a construction of an MS in a mobile communication system according to an exemplary embodiment of the present invention.

As illustrated in FIG. 7, the MS includes a transceiver 700, a message generation and analysis unit 710, a controller 720, and a storage unit 730. The controller 720 includes a transmission power determiner 724 and a transmission power controller 722.

The transceiver 700 converts a signal received through an antenna into a baseband signal and provides to the message generation and analysis unit 710 and, according to the control of the controller 720, converts a signal provided from the message generation and analysis unit 710 into a radio frequency signal and transmits to a serving BS or a neighbor BS through the antenna.

The message generation and analysis unit 710 analyzes a message provided from the transceiver 700 and provides to the controller 720 and, according to the control of the controller 720, generates messages for scanning, previous handover, and handover execution and provides to the transceiver 700.

The controller 720 processes and controls a general operation of the MS and, according to the present invention, controls and processes a function for determining the maximum transmission power of a handover ranging message considering uplink through the transmission power determiner 724 and transmitting a handover ranging message at a level below the determined maximum transmission power through the transmission power controller 722. That is, the transmission power determiner 722 determines the maximum transmission power as in Equation 2 or Equation 3 above using uplink information on a handover target BS acquired from a serving BS through the transceiver 700 and average equivalent isotropic received power for handover ranging message. And, when transmitting a handover ranging message to a handover target BS through the transceiver 700, the transmission power controller 722 controls the transceiver 700 such that the handover ranging message is sent at a power level below the determined maximum transmission power. Also, the controller 720 controls and processes a function for transmitting a scanning message to neighbor BSs for scanning, and storing transmission power of the scanning message in the storage unit 730.

The storage unit 730 stores a program for a general operation of the MS and various kinds of data and, according to the control of the controller 720, stores transmission power of a scanning message.

Figure 8:
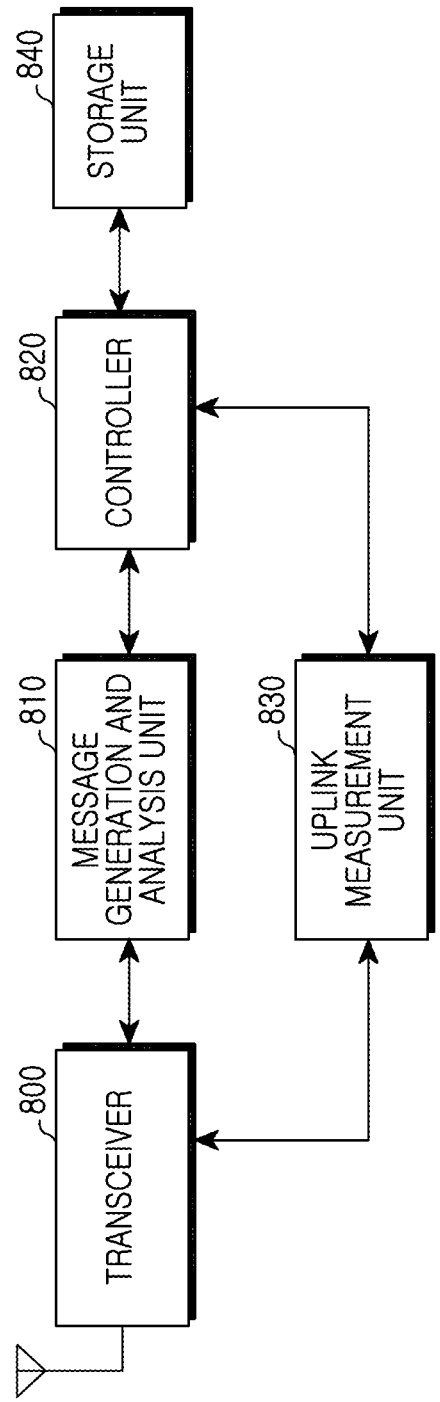
FIG. 8 is a block diagram illustrating a construction of a BS in a mobile communication system according to an exemplary embodiment of the present invention.

FIG. 8 illustrates a construction of a BS in a mobile communication system according to an exemplary embodiment of the present invention.

As illustrated in FIG. 8, the BS includes a transceiver 800, a message generation and analysis unit 810, a controller 820, an uplink measurement unit 830, and a storage unit 840.

The transceiver 800 converts a signal received through an antenna into a baseband signal and provides to the message generation and analysis unit 810, and converts a signal provided from the message generation and analysis unit 810 into a baseband signal and transmits to an MS or a neighbor BS through the antenna.

The message generation and analysis unit 810 analyzes a message provided from the transceiver 800 and provides to the controller 820 and, according to the control of the controller 820, generates messages for scanning, previous handover, and handover execution and provides to the transceiver 800.

The controller 820 process and controls a general operation of the BS and, particularly, when scanning is requested from an MS according to the present invention, controls and processes a function for providing downlink and uplink measurement interval information to the MS and neighbor BS and acquiring uplink measurement information from the neighbor BSs. Also, the controller 820 controls and processes a function for, when handover initiation is requested from the MS or it is judged that handover initiation is necessary due to the attenuation of an uplink signal, transmitting/receiving a handover previous notification message and a handover previous notification response message with the neighbor BSs and determining a handover target BS of the MS, and transmitting ID of the target BS, uplink measurement information, and average equivalent isotropic received power information for handover ranging message to the MS and requesting handover.

Also, the controller 820 controls and processes a function for receiving an uplink measurement interval of a specific MS from a serving BS of the specific MS, performing synchronization with a corresponding MS, measuring an uplink signal in a scanning interval through the uplink measurement unit 830, and transmitting uplink measurement information to the serving BS. Also, the controller 820 controls and processes a function for, when a handover previous notification message is received from the serving BS, transmitting average equivalent isotropic received power or maximum/minimum equivalent isotropic received power for handover ranging message stored in the storage unit 840, to the serving BS. And, the controller 820 controls and processes a function for, when a handover ranging message is received from the MS, controlling the uplink measurement unit 830 and updating average equivalent isotropic received power or maximum/minimum average equivalent isotropic received power for handover ranging message.

The uplink measurement unit 830 measures power of a signal received through the transceiver 800. Particularly, the uplink measurement unit 830 measures an uplink signal received power level of the MS, an interference power level, a noise power level, and the like in an uplink scanning interval of a specific MS according to the control of the controller 820. Also, the uplink measurement unit 830 measures equivalent isotropic received power for handover ranging message received from a plurality of MSs according to the control of the controller 820, determines an average value or determines the maximum value or the minimum value, and provides to the controller 820.

The storage unit 840 stores a program for a general operation of the BS and various kinds of data and, according to the control of the controller 820, stores average equivalent isotropic received power or maximum/minimum equivalent isotropic received power for handover ranging message determined in the uplink measurement unit 830.

Figure 9:
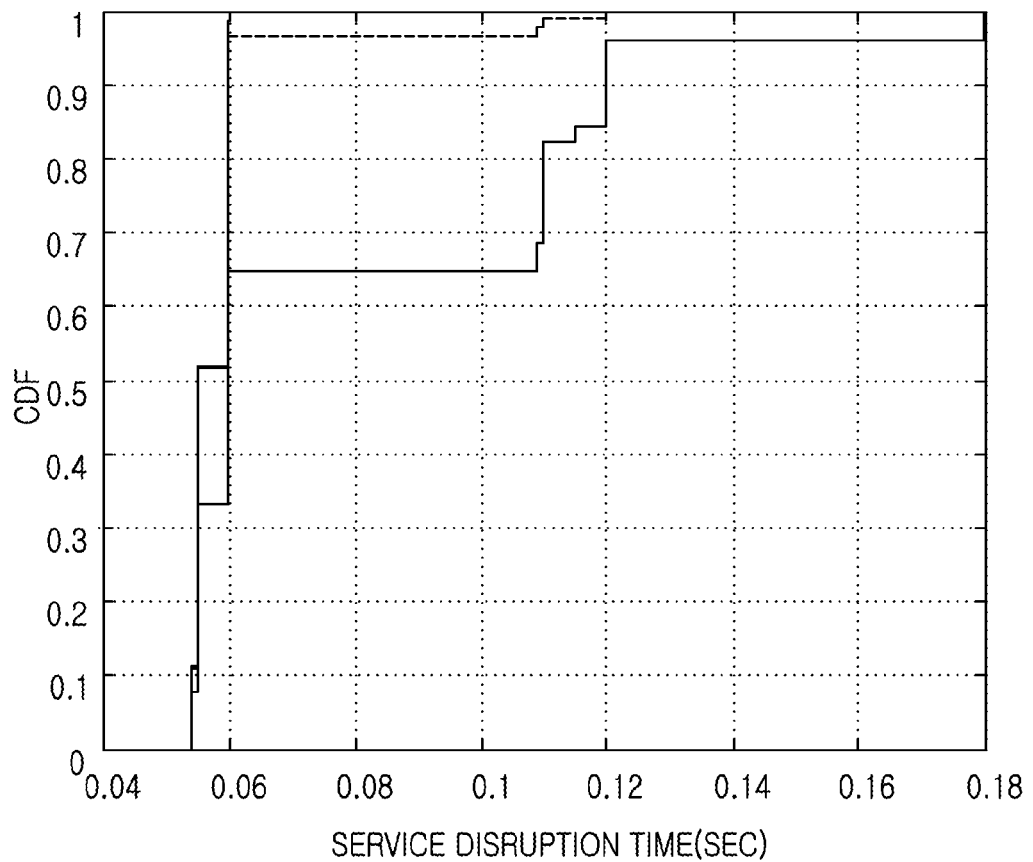
FIG. 9 is a diagram illustrating a service disruption time at execution of handover on the basis of the maximum transmission power according to the conventional art and the present invention.
Figure 10:
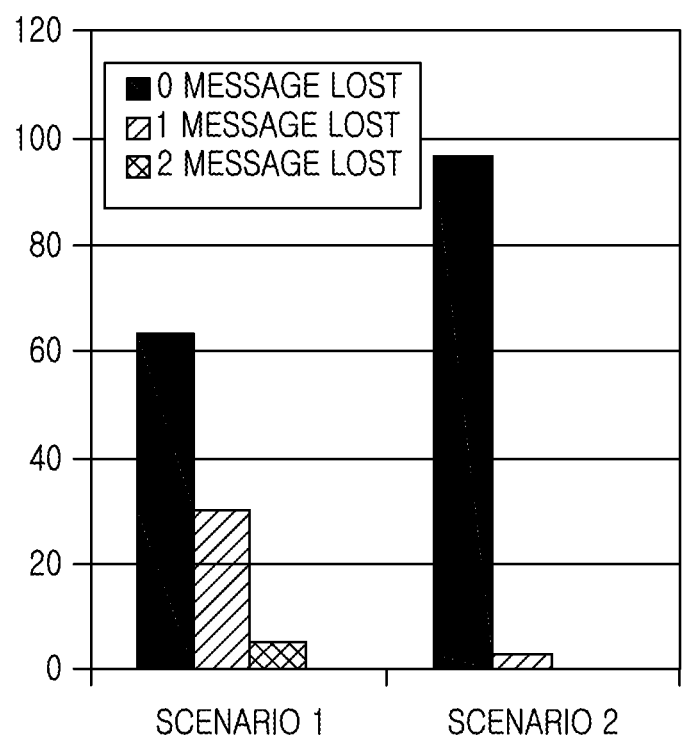
FIG. 10 is a diagram illustrating a handover up message success and failure rate at execution of handover on the basis of the maximum transmission power according to the conventional art and the present invention.

FIG. 9 and FIG. 10 illustrate a service disruption time cumulative distribution and the number of handover up message success and failure according to the conventional art and the present invention. Here, a horizontal axis of FIG. 9 represents a service disruption time, and a vertical axis represents a CDF (Cumulative Distribution Function). A scenario 1 of FIG. 10 represents an up message success and failure rate in case of using the maximum transmission power considering downlink according to the conventional art, and a scenario 2 represents an up message success and failure rate in case of using the maximum transmission power considering uplink according to the present invention.

Referring to FIG. 9 and FIG. 10, it can be appreciated that, compared to the conventional art, a service disruption time is short in case of using the maximum transmission power considering uplink according to the present invention, an up message success rate is high, and a failure rate is low.

Table 1 below numerically expresses a service disruption time and an up message success and failure rate illustrated in FIG. 9 and FIG. 10.

TABLE 1

|  | Conventional art | The invention |
| --- | --- | --- |
| 0 message lost (%) | 63.46 | 98.67 |
| 1 message lost (%) | 30.77 | 1.33 |
| 2 message lost (%) | 5.77 | 0.00 |
| Average service disruption time (sec) | 0.0799 | 0.0581 |

Referring to Table 1 above, it can be appreciated that, in the present invention, the probability of up message reception success is high by 35.21%, the probability of once failure of up message transmitting is low by 29.44%, and there is no probability of twice failure, compared to the conventional art. Also, it can be appreciated that an average service disruption time is short by 0.0218 sec as well.

The present invention has an effect of being capable of increasing the probability that a target BS successfully receives and accordingly, being capable of decreasing a handover interruption time and improving a service quality, by determining the maximum transmission power of a handover message considering uplink of an MS and controlling a ranging code for ranging with a target BS and the transmission power of a ranging request message according to the determined maximum transmission power in a mobile communication system. Also, the present invention has an effect of being capable of decreasing unnecessary handover message exchange in wireless and efficiently making use of radio resources.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling handover message transmission power of a mobile station in a mobile communication system, the method comprising the steps of:

acquiring uplink information on a handover target base station;

determining a maximum transmission power of a handover ranging message using the uplink information; and transmitting the handover target base station a handover ranging message having a power level below the determined maximum transmission power, wherein the uplink information on the handover target base station is generated based on information on a power for handover ranging message that the handover target base station receives from at least one of mobile stations, and wherein the maximum transmission power of the handover ranging message is determined based on any one of Equation 4 and Equation 5 below:

$$P_{TX\_HR\_MAX} = \text{EIRxP}_{HR,max,min,average} - \text{MS\_EIRP} - \text{RSS}_{BS} \quad (4)$$

wherein the '$P_{TX\_HR\_MAX}$' represents the maximum transmission power of the handover ranging message, the 'EIRxP$_{HR,max,min,average}$' represents an average value, maximum value, or minimum value of equivalent isotropic received power for the handover ranging message, the 'MS_EIRP' represents equivalent isotropic radiated power of mobile station, and the 'RSS$_{BS}$' represents a Received Signal Strength Indicator (RSSI) measured in the target base station, and $$P_{TX\_HR\_MAX} = \text{EIRxP}_{HR,max,min,average} - \text{MS\_EIRP} - 10\log(\text{RSS}_{BS}/10 - P_{interference} - P_{noise}) \quad (5)$$

wherein the '$P_{TX\_HR\_MAX}$' represents the maximum transmission power of the handover ranging message, the 'EIRxP$_{HR,max,min,average}$' represents an average value, maximum value, or minimum value of equivalent isotropic received power for the handover ranging message, the 'MS_EIRP' represents equivalent isotropic radiated power of a mobile station, the 'RSS$_{BS}$' represents a Received Signal Strength Indicator (RSSI) measured in the target base station, and the '$P_{interference}$' and the '$P_{noise}$' represent interference power of a linear unit for uplink measured in the target base station and noise power.

2. The method of claim 1, wherein the uplink information comprises at least one of received power of an uplink signal, uplink interference power, uplink noise power, average equivalent isotropic received power for handover ranging message, maximum equivalent isotropic received power for handover ranging message and minimum equivalent isotropic received power for handover ranging message.

3. A method of a serving base station for controlling handover message transmission power of a mobile station in a mobile communication system, the method comprising the steps of:

if a scanning interval allocation request (MOB_SCN_REQ) message is received from a mobile station, providing information on an uplink and downlink measurement interval to the mobile station and neighbor base stations;

receiving uplink information from the neighbor base stations;

when handover initiation is requested from the mobile station, determining a handover target base station among the neighbor base stations; and transmitting uplink information received from the handover target base station to the mobile station, wherein the uplink information received from the handover target base station is generated based on information on a power for handover ranging message that the handover target base station receives from at least one of mobile stations, wherein a maximum transmission power of the handover ranging message is determined based on any one of Equation 4 and Equation 5 below:

$$P_{TX\_HR\_MAX} = \text{EIRxP}_{HR,max,min,average} - MS\_EIRP - RSS_{BS} \quad (4)$$

wherein the '$P_{TX\_HR\_MAX}$' represents the maximum transmission power of the handover ranging message, the '$\text{EIRxP}_{HR,max,min,average}$' represents an average value, maximum value, or minimum value of equivalent isotropic received power for the handover ranging message, the 'MS_EIRP' represents equivalent isotropic radiated power of mobile station, and the '$RSS_{BS}$' represents a Received Signal Strength Indicator (RSSI) measured in the target base station, and $$P_{TX\_HR\_MAX} = \text{EIRxP}_{HR,max,min,average} - MS\_EIRP - 10\log(RSS_{BS}/10 - P_{interference} - P_{noise}) \quad (5)$$

wherein the '$P_{TX\_HR\_MAX}$' represents the maximum transmission power of the handover ranging message, the '$\text{EIRxP}_{HR,max,min,average}$' represents an average value, maximum value, or minimum value of equivalent isotropic received power for the handover ranging message, the 'MS_EIRP' represents equivalent isotropic radiated power of a mobile station, the '$RSS_{BS}$' represents a Received Signal Strength Indicator (RSSI) measured in the target base station, and the '$P_{interference}$' and the '$P_{noise}$' represent interference power of a linear unit for uplink measured in the target base station and noise power.

4. The method of claim 3, wherein the uplink information comprises at least one of received power of an uplink signal, uplink interference power, uplink noise power, and average equivalent isotropic received power for handover ranging message, maximum equivalent isotropic received power for handover ranging message, and minimum equivalent isotropic received power for handover ranging message.

5. A method of a neighbor base station for controlling handover message transmission power of a mobile station in a mobile communication system, the method comprising the steps of:

measuring an uplink signal of a specific mobile station using information on an uplink measurement interval provided from a serving base station of the specific mobile station;

providing the uplink signal measurement result to a mobile station; and providing received power information on a handover ranging message to the mobile station, wherein the received power information is generated based on information on a power for handover ranging message that the neighbor base station receives from at least one of mobile base stations, and wherein a maximum transmission power of the handover ranging message is determined based on any one of Equation 4 and Equation 5 below:

$$P_{TX\_HR\_MAX} = \text{EIRxP}_{HR,max,min,average} - MS\_EIRP - RSS_{BS} \quad (4)$$

wherein the '$P_{TX\_HR\_MAX}$' represents the maximum transmission power of the handover ranging message, the '$\text{EIRxP}_{HR,max,min,average}$' represents an average value, maximum value, or minimum value of equivalent isotropic received power for the handover ranging message, the 'MS_EIRP' represents equivalent isotropic radiated power of mobile station, and the '$RSS_{BS}$' represents a Received Signal Strength Indicator (RSSI) measured in the target base station, and $$P_{TX\_HR\_MAX} = \text{EIRxP}_{HR,max,min,average} - MS\_EIRP - 10\log(RSS_{BS}/10 - P_{interference} - P_{noise}) \quad (5)$$

wherein the '$P_{TX\_HR\_MAX}$' represents the maximum transmission power of the handover ranging message, the '$\text{EIRxP}_{HR,max,min,average}$' represents an average value, maximum value, or minimum value of equivalent isotropic received power for the handover ranging message, the 'MS_EIRP' represents equivalent isotropic radiated power of a mobile station, the '$RSS_{BS}$' represents a Received Signal Strength Indicator (RSSI) measured in the target base station, and the '$P_{interference}$' and the '$P_{noise}$' represent interference power of a linear unit for uplink measured in the target base station and noise power.

6. The method of claim 5, wherein the uplink signal measurement result comprises at least one of received power of an uplink signal, uplink interference power, and uplink noise power.

7. The method of claim 5, wherein the received power information for the handover ranging message is any one of average equivalent isotropic received power and maximum equivalent isotropic received power and minimum equivalent isotropic received power for handover ranging message that the neighbor base station receives from a plurality of mobile stations.

8. A device for controlling handover message transmission power of a mobile station in a mobile communication system, the device comprising:

a transceiver for receiving uplink information on a handover target base station, and transmitting the handover target base station a handover ranging message;

a transmission power determiner for determining a maximum transmission power of a handover ranging message using the uplink information; and a transmission power controller for controlling the handover ranging message to be transmitted at a power level below the determined maximum transmission power, wherein the uplink information on the handover target base station is generated based on information on a power for handover ranging message that the handover target base station receives from at least one of mobile stations, and wherein the maximum transmission power of the handover ranging message is determined based on any one of Equation 4 and Equations 5 below:

$$P_{TX\_HR\_MAX} = \text{EIRxP}_{HR,max,min,average} - MS\_EIRP - RSS_{BS} \quad (4)$$

wherein the '$P_{TX\_HR\_MAX}$' represents the maximum transmission power of the handover ranging message, the 'EIRxP$_{HR,max,min,average}$' represents an average value, maximum value, or minimum value of equivalent isotropic received power for the handover ranging message, the 'MS_EIRP' represents equivalent isotropic radiated power of mobile station, and the 'RSS$_{BS}$' represents a Received Signal Strength Indicator (RSSI) measured in the target base station, and $$P_{TX\_HR\_MAX} = \text{EIRxP}_{HR,max,min,average} - MS\_EIRP - 10\log(RSS_{BS}/10 - P_{interference} - P_{noise}) \quad (5)$$

wherein the '$P_{TX\_HR\_MAX}$' represents the maximum transmission power of the handover ranging message, the 'EIRxP$_{HR,max,min,average}$' represents an average value, maximum value, or minimum value of equivalent isotropic received power for the handover ranging message, the 'MS_EIRP' represents equivalent isotropic radiated power of a mobile station, the 'RSS$_{BS}$' represents a Received Signal Strength Indicator (RSSI) measured in the target base station, and the '$P_{interference}$' and the '$P_{noise}$' represent interference power of a linear unit for uplink measured in the target base station and noise power.

9. The device of claim 8, wherein the uplink information comprises at least one of received power of an uplink signal, uplink interference power, uplink noise power, average equivalent isotropic received power for handover ranging message, maximum equivalent isotropic received power for handover ranging message, and minimum equivalent isotropic received power for handover ranging message.

10. A device of a serving base station for controlling handover message transmission power of a mobile station in a mobile communication system, the device comprising:

a controller for, if a scanning interval allocation request (MOB_SCN_REQ) message is received from a mobile station, providing information on an uplink and downlink measurement interval to the mobile station and neighbor base stations, and transmitting uplink information received from the neighbor base stations to the mobile station, wherein the uplink information received from the neighbor base station is generated based on information on a power for handover ranging message that the handover target base station receives from at least one of mobile stations, and wherein a maximum transmission power of the handover ranging message is determined based on any one of Equation 4 and Equation 5 below:

$$P_{TX\_HR\_MAX} = \text{EIRxP}_{HR,max,min,average} - MS\_EIRP - RSS_{BS} \quad (4)$$

wherein the '$P_{TX\_HR\_MAX}$' represents the maximum transmission power of the handover ranging message, the 'EIRxP$_{HR,max,min,average}$' represents an average value, maximum value, or minimum value of equivalent isotropic received power for the handover ranging message, the 'MS_EIRP' represents equivalent isotropic radiated power of mobile station, and the 'RSS$_{BS}$' represents a Received Signal Strength Indicator (RSSI) measured in the target base station, and $$P_{TX\_HR\_MAX} = \text{EIRxP}_{HR,max,min,average} - MS\_EIRP - 10\log(RSS_{BS}/10 - P_{interference} - P_{noise}) \quad (5)$$

wherein the '$P_{TX\_HR\_MAX}$' represents the maximum transmission power of the handover ranging message, the 'EIRxP$_{HR,max,min,average}$' represents an average value, maximum value, or minimum value of equivalent isotropic received power for the handover ranging message, the 'MS_EIRP' represents equivalent isotropic radiated power of a mobile station, the 'RSS$_{BS}$' represents a Received Signal Strength Indicator (RSSI) measured in the target base station, and the '$P_{interference}$' and the '$P_{noise}$' represent interference power of a linear unit for uplink measured in the target base station and noise power.

11. The device of claim 10, wherein the uplink information comprises at least one of received power of an uplink signal, uplink interference power, uplink noise power, average equivalent isotropic received power for handover ranging message, maximum equivalent isotropic received power for handover ranging message, and minimum equivalent isotropic received power for handover ranging message.

12. A device of a neighbor base station for controlling handover message transmission power of a mobile station in a mobile communication system, the device comprising:

an uplink measurement unit for measuring an uplink signal of a specific mobile station using information on an uplink measurement interval provided from a serving base station of the specific mobile station, and measuring received power for handover ranging message; and a controller for controlling to provide the uplink signal measurement result and information on the measured received power for the handover ranging message to a mobile station, wherein the received power information for the handover ranging message is at least one of average equivalent isotropic received power, maximum equivalent isotropic received power, or minimum equivalent isotropic received power for handover ranging message that the neighbor base station receives from at least one of mobile stations, and wherein a maximum transmission power of the handover ranging message is determined based on any one of Equation 4 and Equation 5 below:

$$P_{TX\_HR\_MAX} = \text{EIRxP}_{HR,max,min,average} - MS\_EIRP - RSS_{BS} \quad (4)$$

wherein the '$P_{TX\_HR\_MAX}$' represents the maximum transmission power of the handover ranging message, the 'EIRxP$_{HR,max,min,average}$' represents an average value, maximum value, or minimum value of equivalent isotropic received power for the handover ranging message, the 'MS_EIRP' represents equivalent isotropic radiated power of mobile station, and the 'RSS$_{BS}$' represents a Received Signal Strength Indicator (RSSI) measured in the target base station, and $$P_{TX\_HR\_MAX} = \text{EIRxP}_{HR,max,min,average} - MS\_EIRP - 10\log(RSS_{BS}/10 - P_{interference} - P_{noise}) \quad (5)$$

wherein the '$P_{TX\_HR\_MAX}$' represents the maximum transmission power of the handover ranging message, the 'EIRxP$_{HR,max,min,average}$' represents an average value, maximum value, or minimum value of equivalent isotropic received power for the handover ranging message, the 'MS_EIRP' represents equivalent isotropic radiated power of a mobile station, the '$RSS_{BS}$' represents a Received Signal Strength Indicator (RSSI) measured in the target base station, and the '$P_{interference}$' and the '$P_{noise}$' represent interference power of a linear unit for uplink measured in the target base station and noise power.

13. The device of claim 12, wherein the uplink signal measurement result comprises at least one of received power of an uplink signal, uplink interference power, and uplink noise power.

* * * * *